United States Patent
Zhao et al.

(10) Patent No.: US 7,254,209 B2
(45) Date of Patent: Aug. 7, 2007

(54) ITERATIVE CT RECONSTRUCTION METHOD USING MULTI-MODAL EDGE INFORMATION

(75) Inventors: Qi Zhao, Ossining, NY (US); Chunhe Gong, Niskayuna, NY (US); Bruno De Man, Clifton Park, NY (US); Samit Kumar Basu, Niskayuna, NY (US); Fracis Howard Little, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 132 days.

(21) Appl. No.: 10/707,031

(22) Filed: Nov. 17, 2003

(65) Prior Publication Data

US 2005/0105693 A1 May 19, 2005

(51) Int. Cl.
*A61B 6/03* (2006.01)
(52) U.S. Cl. .......................................... 378/4; 378/901
(58) Field of Classification Search .................... 378/4, 378/7, 8, 15, 19, 901
See application file for complete search history.

(56) References Cited

U.S. PATENT DOCUMENTS

| | | | | |
|---|---|---|---|---|
| 5,848,115 A | * | 12/1998 | Little et al. ..................... | 378/4 |
| 5,909,476 A | | 6/1999 | Cheng et al. ................... | 378/4 |
| 6,002,739 A | | 12/1999 | Heumann ...................... | 378/8 |
| 6,381,349 B1 | * | 4/2002 | Zeng et al. .................. | 382/128 |
| 6,724,856 B2 | * | 4/2004 | De Man et al. .............. | 378/62 |
| 2003/0103666 A1 | * | 6/2003 | Edic et al. ................... | 382/132 |
| 2003/0156684 A1 | | 8/2003 | Fessler ........................ | 378/210 |
| 2005/0105679 A1 | * | 5/2005 | Wu et al. ....................... | 378/22 |

FOREIGN PATENT DOCUMENTS

EP WO 02/067201 A1 8/2002

OTHER PUBLICATIONS

J. A. Browne, J. M. Boone, and T. J. Homes, "Maximum-likelihood x-ray computed-tomography finite-beamwidth considerations;" Applied Optics, vol. 34, No. 23, Aug. 10, 1995; pp. 5199-5207.

B. De Man, J. Nuyts, P. Dupont, G. Marchal, and P. Suetens, "An Iterative Maximum-Likelihood Polychromatic Algorithm for CT;" IEEE Transactions on Medical Imaging, vol. 20, No. 10, Oct. 2001; pp. 999-1008.

B. De Man, J. ohan Nuyts, and P. Suetens; "IMPACT: Iterative Maximum-likelihood Polychromatic Algorithm for CT".

(Continued)

*Primary Examiner*—Edward J. Glick
*Assistant Examiner*—Chih-Cheng Glen Kao
(74) *Attorney, Agent, or Firm*—Fletcher Yoder

(57) ABSTRACT

A computed tomography (CT) reconstruction method includes implementing an iterative image reconstruction process for CT metrology of an object, wherein the iterative reconstruction process utilizes accurate forward projection. During each of a plurality of iterations, a reconstructed image is constrained by utilizing prior outer edge information obtained from a modality in addition to CT, and then transformed to a projection domain so as to generate a calculated sinogram. A correction image is determined based on the calculated sinogram and a measured sinogram.

14 Claims, 7 Drawing Sheets

OTHER PUBLICATIONS

Bruno De Man; Iterative Reconstruction for Reduction of Metal Artifacts in Computed Tomography; 2001.

I. A. Elbakri and J. A. Fessler; "Statistical Image Reconstruction for Polyenergetic X-Ray Computed Tomography;" IEEE Transactions on Medical Imaging, vol. 21, No. 2, Feb. 2002; pp. 89-99.

I. A. Elbakri and J. A. Fessler; "Segmentation-Free Statistical Image Reconstruction for Polyenergetic X-Ray Computed Tomography;" IEEE; 2002; pp. 828-831.

D.J. Heuscher and M. Vembar; "Reduced partial volume artifacts using spiral computed tomography and an integrating interpolator;" Assoc. Phys. Med, Med. Phys. 26 (2), Feb. 1999; pp. 276-286.

Hee-Joung Kim, Barry R. Zeeberg, Richard C. Reba; "Grey and White Matter Spect Neuroimaging: Iterative Reconstruction Using a High Resolution Anatomical Image to Correct for 3-D Detector Response, Attenuation, and Scatter;" IEEE; 1993; pp. 1002-1004.

J. Nuyts, B. De Man, P. Dupont, M. Defrise, P. Suetens, and L. Mortelmans; "Iterative reconstruction for helical CT: a simulation study;" Phs. Med. Biol. 43; 1998; pp. 729-737.

De Man, B. et al.; "An Iterative Maximum-Likelihood Polychromatic Algorithm for CT"; IEEE Transactions on Medical Imaging, IEEE Inc., New York, US, vol. 20, No. 10, Oct. 2001, pp. 999-1008.

Brix, G. et al.; "Use of Scanner Characteristics in Iterative Image Reconstruction for High-Resolution Positron Emission Tomography Studies of Small Animals"; European Journa of Nuclear Medicine, vol. 24, No. 7, Jul. 1997; pp. 779-786.

Werling, Alexander et al.; "Fast Implementation of the Single Scatter Simulation Algorithm and Its Use in Iterative Image Reconstruction of PET Data"; Physics in Medicine and Biology IOP Publishing UK, vol. 47, No. 16, Aug. 1, 2002, pp. 2947-2960.

Gind, G. et al.; "Bayesian Reconstruction of Functional Images Using Anatomical Information as Priors"; IEEE Transactions on Medical Imaging, IEEE Inc., New York, US, vol. 12, No. 4, Dec. 1, 1993, pp. 670-680.

* cited by examiner

ITERATIVE CT RECONSTRUCTION METHOD USING MULTI-MODAL EDGE INFORMATION

BACKGROUND OF THE INVENTION

The present disclosure relates generally to computed tomography (CT) imaging and inspection systems and, more particularly, to a method for iterative CT reconstruction using multi-modal edge information.

In present date industrial inspection processes, different types of measurement systems are available such as computed tomography (CT), coordinate measuring machines (CMM), laser-based profilometry, etc. Each inspection modality has its own advantages and disadvantages associated therewith. Modalities such as CMM and laser-based profilometry can measure external surfaces with high accuracy, but cannot measure internal features unless the part is cut open. To date, CT is the most versatile of the measurement/inspection systems for revealing both the internal and external structures of industrial parts in a non-destructive manner. The potential industrial applications of CT include reverse engineering, rapid prototyping, casting simulation & validation, tire development, first article inspection, ceramic porosity inspection, process validation, parts qualification and defect detection, to name a few. However, the low inspection accuracy of CT inhibits widespread applications thereof.

For example, in the area of reverse engineering, CT is a poor choice for capturing detailed external surface features, which can be crucial for capturing the design intent. The factors affecting CT accuracy in this regard include (among other aspects) beam-hardening, partial volume effect, scattering and off-focal radiation. Thus, in order to improve CT inspection accuracy, more effective methods are needed for removing the effects of these artifacts. In the area of CT image reconstruction, filtered backprojection (FBP) is a common technique because of its fast computation and ease of implementation. However, because FBP oversimplifies the CT data acquisition into an ideal Radon transform (i.e., Fan Beam transform, cone beam transform or any other transform depending on the particular acquisition geometry), the reconstructed image suffers from artifacts such as beam hardening and partial volume as discussed above, contributing to degraded image quality and inspection accuracy. Precorrection of the data prior to performing an FBP reconstruction is generally not capable of fully correcting for the artifacts due to these effects.

Another type of CT image reconstruction methodology is what is referred to as iterative reconstruction. These techniques are based on different mathematical principles, such as the statistical approach of maximum likelihood, and the least squares approach, for example. Iterative methods allow for the incorporation of a dedicated forward model of the data acquisition. On the other hand, because the computation associated with iterative reconstruction is highly intensive, iterative methods are not yet widely used in CT. As such, in present inspection processes, CT images are typically reconstructed using the FBP method where both external and internal features are extracted from the CT images. In the event a more accurate measurement of internal features is desired, the part is generally cut open and inspected by CMM. Thereafter, the CT measurement is calibrated using the CMM measurement, so as to compensate for any possible bias. Unfortunately, this procedure is both time-consuming and expensive.

Accordingly, it is desirable to be able to provide an improved inspection method that accurately captures both the internal and external features of an object to be inspected, but in a time efficient and inexpensive manner.

BRIEF DESCRIPTION OF THE INVENTION

The above discussed and other drawbacks and deficiencies of the prior art are overcome or alleviated by an accurate computed tomography (CT) reconstruction method. In an exemplary embodiment, the method includes implementing an iterative image reconstruction process for CT metrology of an object, wherein the iterative reconstruction process utilizes an accurate forward projection model.

In another aspect, a method for implementing an iterative reconstruction of a computed tomography (CT) image includes, during each of a plurality of iterations, generating a reconstructed image. The reconstructed image is constrained by utilizing prior outer edge information obtained from a modality in addition to CT, and then transformed to a projection domain so as to generate a calculated sinogram. A correction image is determined based on the calculated sinogram and a measured sinogram.

In still another aspect, a method for implementing an iterative reconstruction of a computed tomography (CT) image includes, during each of a plurality of iterations, generating a reconstructed image. The reconstructed image is constrained utilizing prior outer edge information obtained from a modality in addition to CT and transformed to a projection domain utilizing so as to generate a calculated sinogram. A correction image is determined based on the calculated sinogram and a measured sinogram, wherein the iterative reconstruction utilizes an accurate forward projection in determining the calculated sinogram.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is a computed tomography (CT) reconstruction method having improved inspection accuracy, in which accurate forward projection is used in an iterative image reconstruction process applied to CT metrology of an object. Thereby, a more accurately calculated image projection (sinogram) is used in the iterative correction process.

In another aspect, external edge information from modalities such as coordinate measurement machine (CMM), micrometer and laser-based profilometry, (which are much more accurate than CT) or any other imaging device that gives some edge information about the inspected object, are incorporated into iterative CT image reconstruction algorithms. The problems addressed by the present disclosure include the improvement of the overall accuracy of the contours, the correction of artifacts and/or the improvement of the CT image quality, by using prior edge information. In addition to accurately modeling the physics of the acquisition, the invention embodiments herein may also utilize prior information (e.g., such as the edge information from a much more accurate measurement system) as constraints to correct artifacts, improve CT image quality, and/or improve the overall accuracy of the contours. The use of the prior edge information with iterative reconstruction is broadly applicable to the field of CT imaging. Furthermore, such prior information obtained from other modalities may be used in conjunction with accurate forward projection in the field of CT metrology.

The particular reconstruction algorithms used may be either iterative filtered back projection (IFBP), or any other iterative algorithm such as those based on maximum a posteriori probability (MAP), maximum likelihood (ML), algebraic reconstruction technique (ART), entropy-based optimization, least squares (LS) or penalized weighted least squares (PWLS). In the embodiments utilizing prior edge information, the outer edge is constrained to satisfy the information obtained from the other modalities. In practice, this may be carried out during each iteration by adjusting the outer edge according to the information obtained by CMM or other laser-based profilometry, each time an intermediate reconstruction is obtained.

Figure 1:
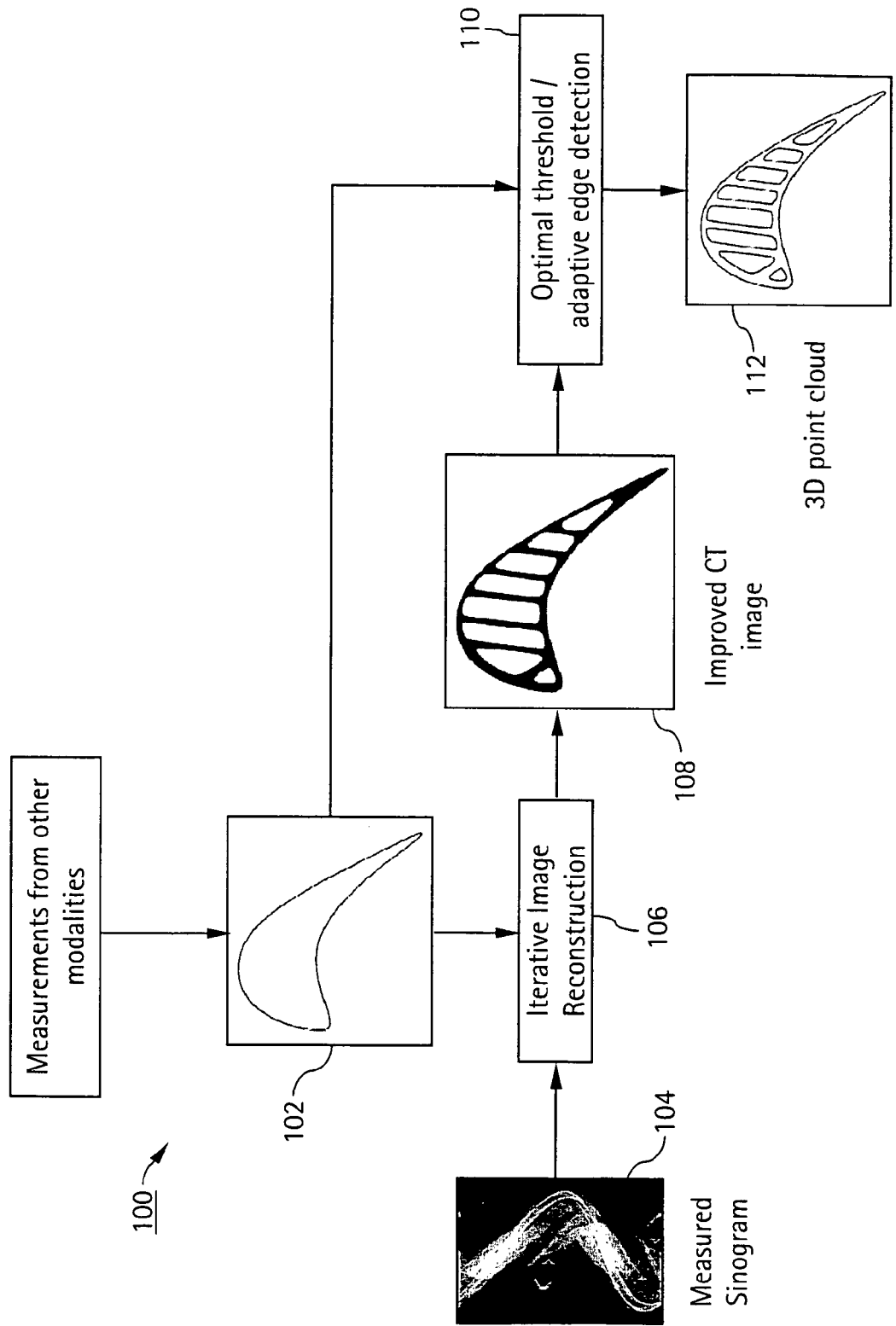
FIG. 1 is a schematic block diagram illustrating a method for iterative CT reconstruction using a priori multi-modal edge information, in accordance with an embodiment of the invention.

Referring initially to FIG. 1, there is shown a block diagram illustrating an overall process 100 for iterative CT reconstruction of an imaged object using a priori multimodal edge information, in accordance with an embodiment of the invention. In particular, prior edge information 102 is obtained from an accurate measurement system such as a coordinate measuring machine (CMM) or laser-based profilometry, for example. This prior information 102 is used during the CT image reconstruction process, along with a measured sinogram 104 to remove artifacts or improve the edge position accuracy, and during the edge detection process to reduce the edge detection error. As shown in FIG. 1, an iterative image reconstruction scheme 106 receives the sinogram 104 and the prior edge information 102 as inputs thereto. Using both sinogram information and prior edge information, the application of the iterative image reconstruction results in an improved CT image, as shown in block 108.

Moreover, the process 100 may also include post-processing steps that utilize the prior edge information 102 and the improved CT image 108 for optimal threshold/adaptive edge detection, as shown at block 110. As a result, a two or three-dimensional point cloud 112 may be constructed for providing a description of the edges of the imaged object.

Figure 2:
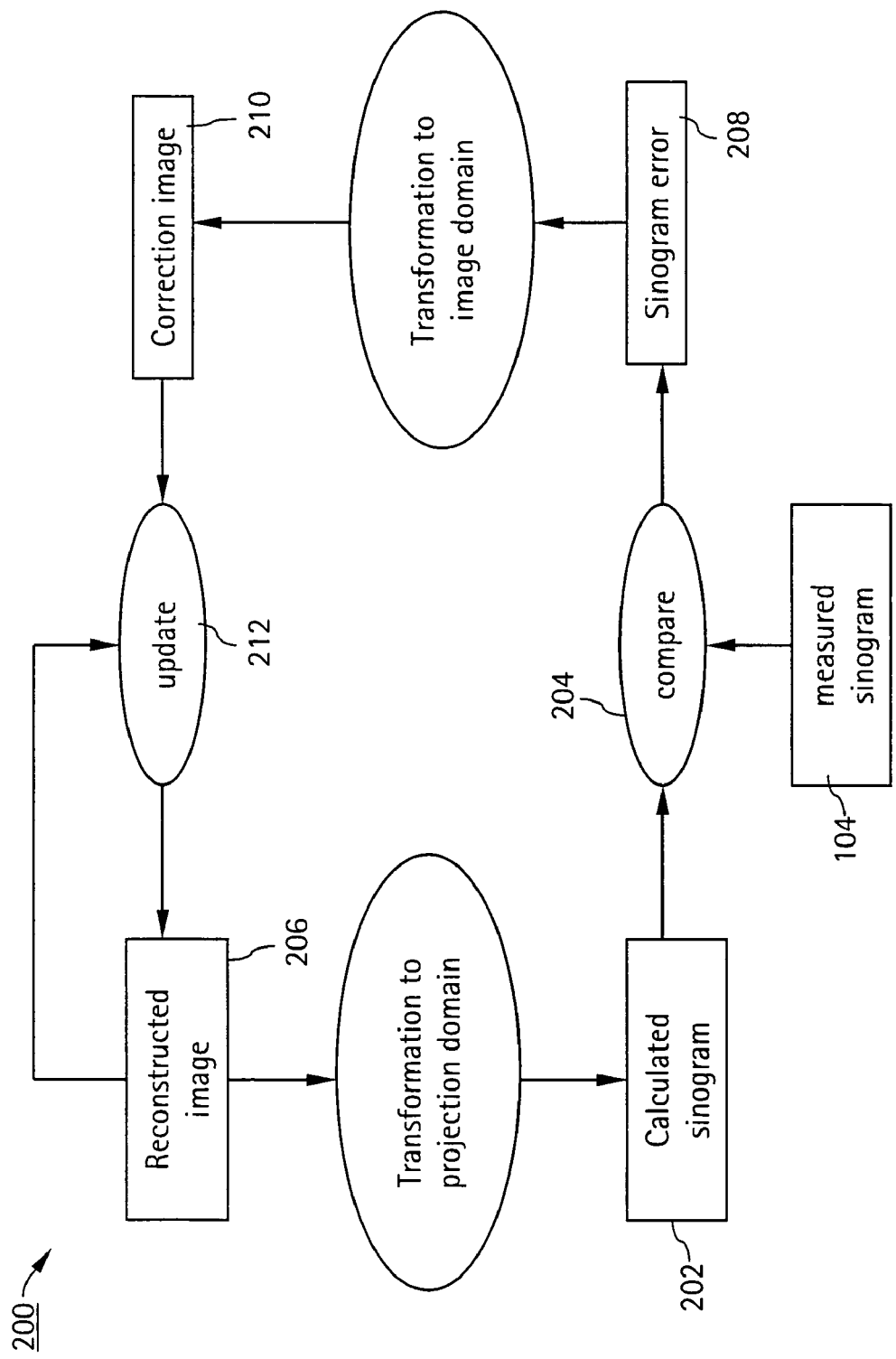
FIG. 2 is a schematic block diagram illustrating a general iterative reconstruction process.

In order to appreciate the benefits provided by the present invention embodiments, reference is made to FIG. 2 in which there is shown a schematic block diagram outlining a general iterative reconstruction process 200. In such a process, the image estimate is updated and transformed back and forth between the projection domain and the image domain. The particular manner in which transformation between the domains is performed distinguishes different reconstruction methods. For instance, iterative FBP methods use FBP to reconstruct an image and they use a Radon or Fan Beam (or other, depending on the geometry) transform to calculate a sinogram.

More specifically, a calculated sinogram 202 (i.e., a set of predicted projection data) is compared with the actual measured sinogram data 104, as shown at block 204. Initially, the calculated sinogram 202 is a transformation from a predicted reconstructed image 206. In the first iteration, the reconstructed image may be any appropriate default setting. As a result of the comparison of the calculated sinogram 202 and the measured sinogram 104, a sinogram error 208 is produced. The sinogram error 208 is then transformed back to the image domain to produce a correction image 210. Thus, in a subsequent iteration, the correction image 210 is used along with the previous reconstructed image to create an updated reconstructed image 206 for the next iteration, as shown at block 212. Thereafter, the process is repeated for a desired number of iterations or until some other stopping criterion is met.

Figure 3:
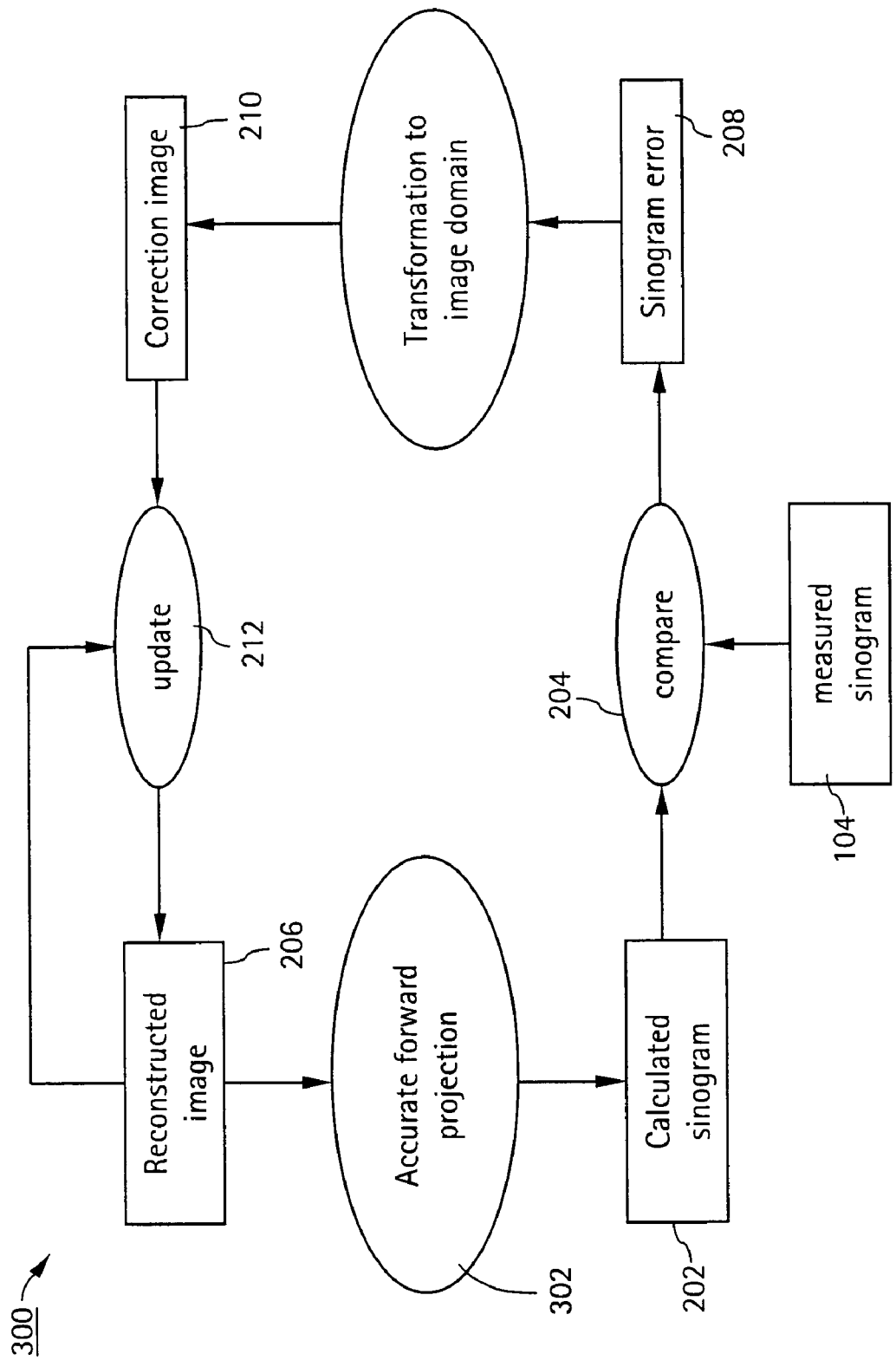
FIG. 3 is a schematic block diagram illustrating an iterative reconstruction scheme with accurate forward projection, in accordance with a further aspect of the present invention.

As indicated previously, and with particular regard to capturing detailed external features, the reconstructed image 206 suffers from artifacts due to physical effects such as beam hardening and partial volume. Therefore, as shown in FIG. 3, an iterative reconstruction scheme 300 is disclosed that includes an accurate forward projection model 302 for use in CT metrology of an object. With the accurate forward projection (instead of using an ideal Radon transform), physical effects of the acquisition, such as a polychromatic x-ray spectrum, a finite detector point-spread function, a finite focal spot size, azimuthal blur, scattered radiation, measurement noise, or off-focal radiation, are each taken into account. In particular, an iterative maximum-likelihood polychromatic algorithm for CT (IMPACT) is used for preventing beam hardening effects. In the IMPACT algorithm, the continuous spectrum of the x-ray tube is modeled as a number of discrete energies. The energy dependence of the attenuation is taken into account by decomposing the linear attenuation coefficient into a photoelectric component and a Compton scatter component. The relative weight of these components is constrained based on prior material assumptions. Additional information regarding the IMPACT algorithm as part of a forward projection model may be found in Bruno DeMan, Johan Nuyts, Patrick Dupont, Guy Marchal, and Paul Suetens, "An Iterative Maximum-Likelihood Polychromatic Algorithm for CT," IEEE Trans. Med. Imag., vol. 20, No. 10, pp. 999–1008, October, 2001, the contents of which are incorporated herein by reference in their entirety.

In addition, the iterative reconstruction algorithm may be adapted to take into account scatter. If a scatter estimate is available (from a measurement or a simulation), instead of subtracting it from the measurements, it can be used as an input of the reconstruction algorithm. Additional information regarding scatter may be found in Bruno DeMan, "Iterative Reconstruction for Reduction of Metal Artifacts in Computed Tomography," PhD Thesis, Katholieke Universiteit Leuven, May 21, 2001, the contents of which are incorporated herein by reference in their entirety.

Furthermore, since finite beamwidth is one of the limiting factors in determining achievable spatial resolution of the scanner, it is also taken into account in the iterative reconstruction algorithm by incorporation in the accurate forward projection, which would otherwise operate under the assumption that the beamwidth is infinitesimal. For instance, the accurate forward projection can model the detector point spread function, the finite detector aperture, the finite focal spot size, azimuthal blur, detector cross-talk, and off-focal radiation. Additional information regarding consideration of finite beamwidth in maximum likelihood algorithms may be found in Jolyon A. Browne, John M. Boone, and Timothy J. Holmes, "Maximum-Likelihood X-ray Computed-Tomography Finite-Beamwidth Consideration," Applied Optics, vol. 34, No. 23, pp. 5199–5207, Aug. 10, 1995, the contents of which are incorporated herein by reference in their entirety.

Figure 4:
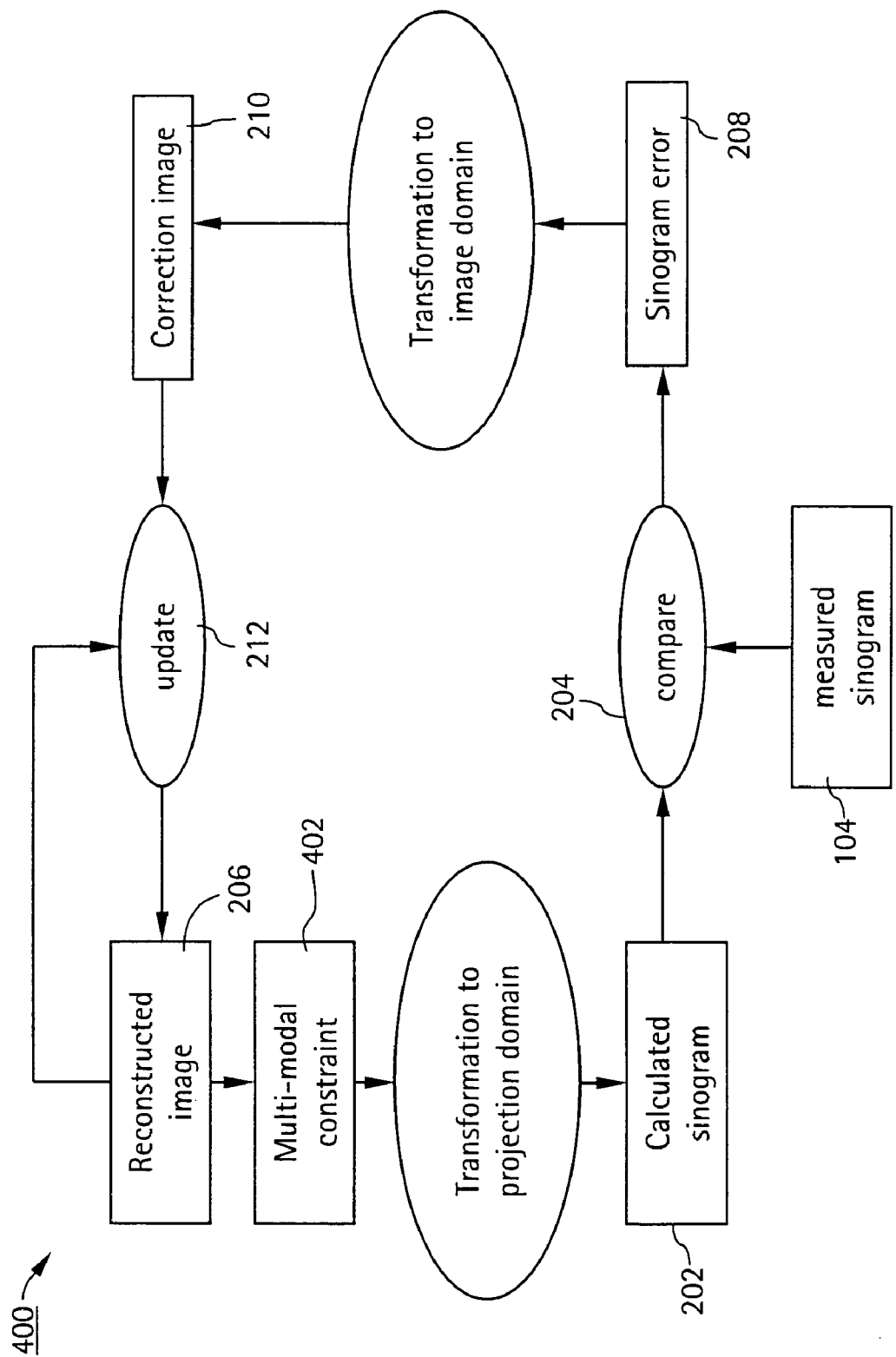
FIG. 4 is a schematic block diagram illustrating an iterative reconstruction scheme with multi-modal constraint, in accordance with a further aspect of the present invention.

Referring now to FIG. 4, there is shown an alternative iterative reconstruction scheme 400 utilizing multi-modal constraint information 402, in accordance with a further aspect of the present invention. As is shown, the multi-modal constraint information 402 (e.g., external edge information, such as obtained through CMM or laser-based measurement systems) is used to modify the current estimated reconstruction image, prior to calculating an updated sinogram 202 for comparison with the measured sinogram 104. In this exemplary embodiment, the multi-modal constraint information 402 is used to adjust the outer edge information in each iteration.

Figure 5:
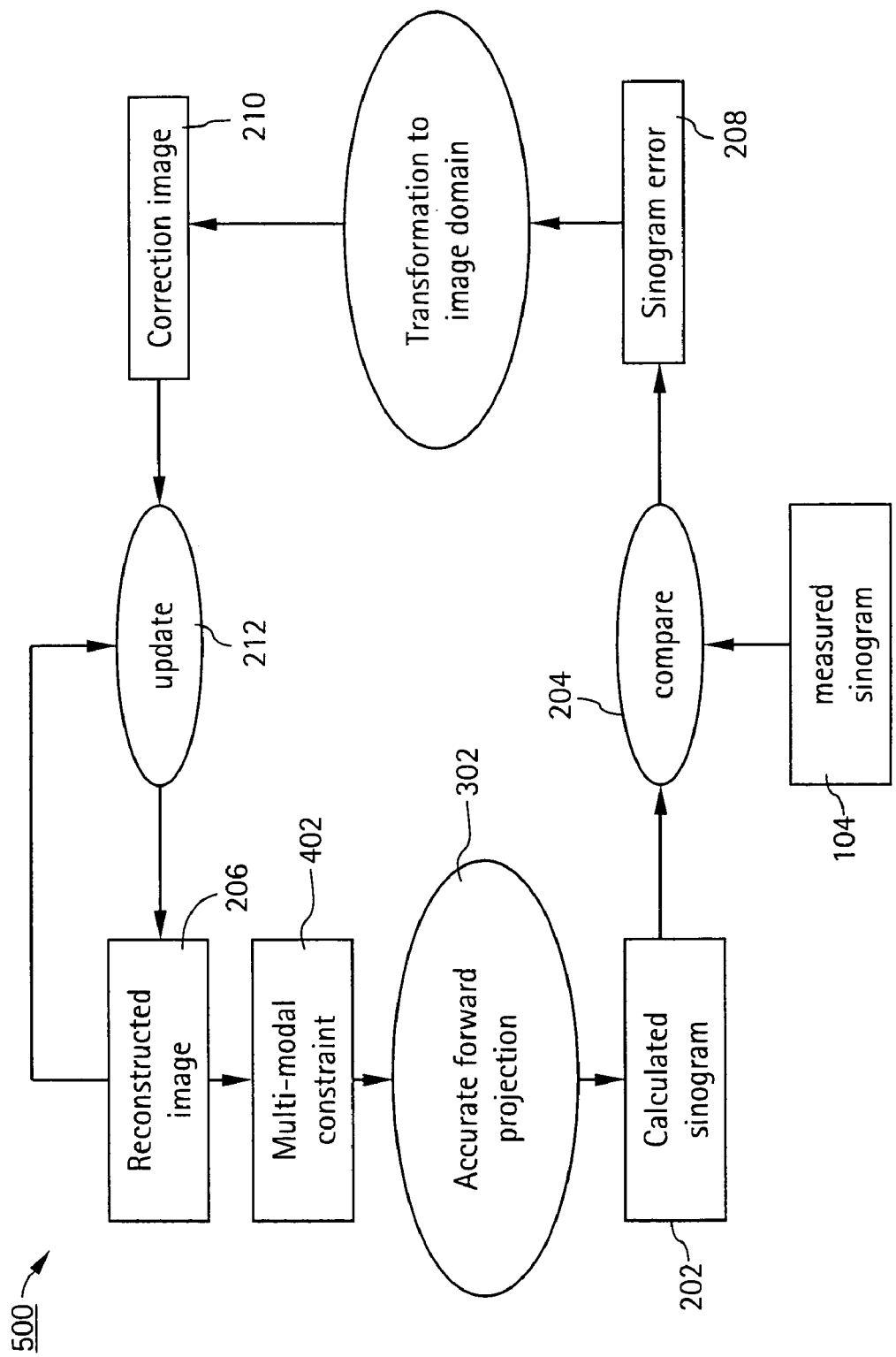
FIG. 5 is a schematic block diagram illustrating an iterative reconstruction scheme with accurate forward projection and multi-modal constraint as shown in FIG. 1, in accordance with a further aspect of the present invention.

FIG. 5 illustrates still another iterative reconstruction scheme 500 in which both the multi-modal constraint information 402 and the accurate forward projection 302 model parameters are utilized in the sinogram calculation.

Figure 6:
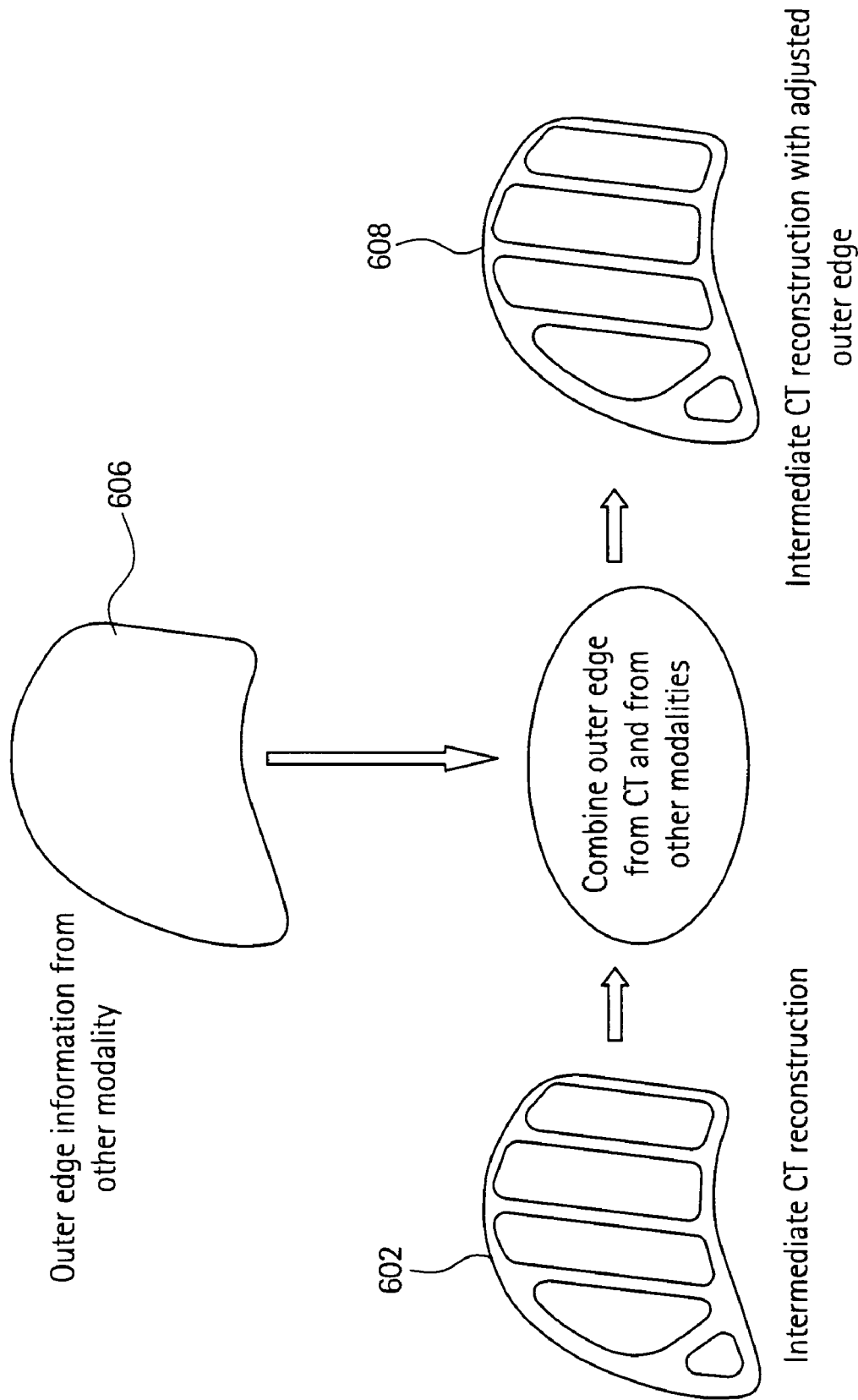
FIG. 6 is a schematic depiction illustrating the use of outer boundary information in the iterative reconstruction process of FIGS. 4 and 5.

FIG. 6 is a schematic depiction illustrating the use of outer boundary information in the iterative reconstruction process of the embodiments of FIGS. 4 and 5. As is shown, the outer edges from an intermediate reconstruction (iteration) 602 are combined with the outer edge data 606 obtained from another modality to result in an updated image 608. In each successive iteration, outer edges from intermediate reconstruction are again adjusted by using the accurate outer edge information.

Figure 8:
FIG. 8 is an image produced using the iterative FBP reconstruction with accurate forward projection and multi-modal constraint.
Figure 7:
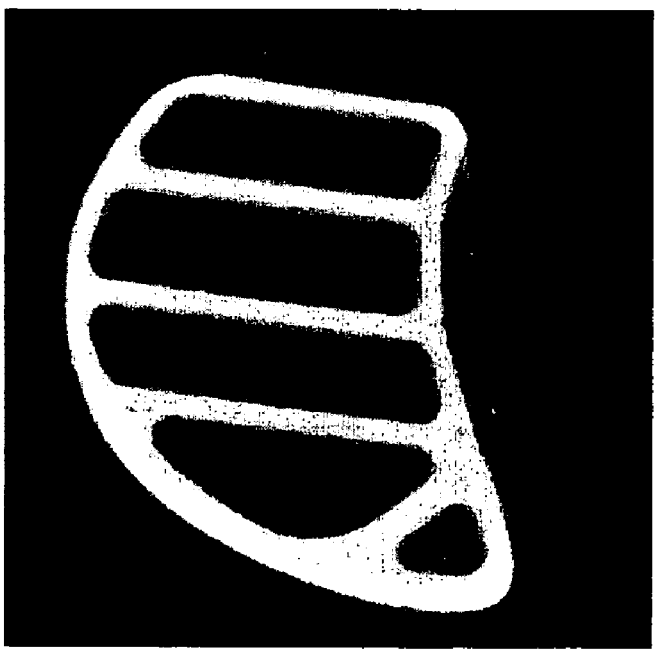
FIG. 7 is an image produced using standard FBP reconstruction of simulated data, wherein beam hardening, partial volume and other artifacts are present.

Finally, FIGS. 7 and 8 illustrate a comparison (based on simulated data) between an image produced using standard FBP reconstruction, and an image produced using accurate forward projection and multi-modal constraint, as described above. As can be seen from FIG. 7, the conventional FBP process (with beam hardening and partial volume and other artifacts) results in an external edge RMS error of 1.04 mil and an internal edge RMS error of 0.64 mil. On the other hand, FIG. 8 is an image produced using the iterative FBP reconstruction with accurate forward projection and multi-modal constraint. Compared with conventional FBP method in FIG. 7, the present method further reduces the RMS error from 1.04 mil (FBP) to 0.06 mil for external features and 0.64 mil (FBP) to 0.25 mil for internal features.

As will be appreciated, the use of an accurate forward projection in each iteration removes image artifacts such as beam hardening and partial volume. Accurate forward projection also improves the image quality, and improves CT inspection accuracy. In addition, the use of external edge information in each iteration may also help the artifact correction procedure and improve the overall accuracy of the contours. Another benefit is realized from the substantially increased convergence speed of the iterative reconstruction, by the use of outer edge constraints. Furthermore the embodiments described herein should not be construed as being limited to a specific type of CT geometry. For example, the CT geometry used to perform the image reconstruction may be 2D or 3D, whereas the beam geometry may be parallel-beam, fan-beam, cone-beam, or any other exotic geometry types known to one skilled in the art.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for implementing an iterative reconstruction of a computed tomography (CT) image, the method comprising:
    during each of a plurality of iterations, generating a reconstructed image;
    constraining said reconstructed image at each successive iteration by utilizing prior outer edge information obtained from a modality in addition to CT;
    transforming said constrained reconstructed image to a projection domain so as to generate a calculated sinogram;
    determining at least one of a correction image and a corrected image based on said calculated sinogram and a measured sinogram; and
    displaying the corrected image.

2. The method of claim 1, wherein said modality in addition to CT further comprises one of: a coordinate measuring machine (CMM), a micrometer, and a laser-based measurement system.

3. The method of claim 2, further comprising:
    following completion of said plurality of iterations, using a resulting completed reconstructed image and said prior outer edge information to generate a 3D point cloud of the CT image.

4. The method of claim 1, wherein said generating a reconstructed image is implemented through at least one of:

an iterative filtered back projection (FBP) algorithm, a maximum a posteriori probability (MAP) algorithm, a maximum likelihood (ML) algorithm, an algebraic reconstruction technique (ART) algorithm, an entropy-based algorithm, a least squares (LS) algorithm and a penalized weighted least squares (PWLS) algorithm.

5. A method for implementing an iterative reconstruction of a computed tomography (CT) image, the method comprising:

during each of a plurality of iterations, generating a reconstructed image;

constraining said reconstructed image at each successive iteration utilizing prior outer edge information obtained from a modality in addition to CT and transforming said constrained reconstructed image to a projection domain so as to generate a calculated sinogram;

determining at least one of a correction image or a corrected image based on said calculated sinogram and a measured sinogram; and displaying the corrected image;

wherein the iterative reconstruction utilizes a forward projection in determining said calculated sinogram.

6. The method of claim 5, wherein said modality in addition to CT further comprises one of: a coordinate measuring machine (CMM), a micrometer, and a laser-based measurement system.

7. The method of claim 6, further comprising:

following completion of said plurality of iterations, using a resulting completed reconstructed image and said prior outer edge information to generate a 3D point cloud of the CT image.

8. The method of claim 5, wherein said generating a reconstructed image is implemented through at least one of: an iterative filtered back projection (IFBP) algorithm, a maximum a posteriori probability (MAP) algorithm, a maximum likelihood (ML) algorithm, an algebraic reconstruction technique (ART) algorithm, an entropy-based algorithm, a least Squares (LS) algorithm and a penalized weighted least squares (PWLS) algorithm.

9. The method of claim 7, wherein said forward projection includes using a polychromatic x-ray acquisition model.

10. The method of claim 9, wherein using a polychromatic x-ray acquisition model further comprises:

decomposing a linear attenuation coefficient into a photoelectric component and a Compton scatter component; and constraining a relative weight of said photoelectric component and said Compton scatter component based on prior material assumptions.

11. The method of claim 7, wherein said forward projection includes incorporating finite x-ray beamwidth considerations, said finite x-ray beamwidth considerations including at least one of detector point-spread function, detector aperture, detector cross-talk, focal-spot size, off-focal radiation, azimuthal blur, and detector memory effects.

12. The method of claim 7, wherein said forward projection includes incorporating scattered radiation considerations.

13. A storage medium, comprising:

a machine readable computer program code for implementing an iterative reconstruction of a computed tomography (CT) image; and instructions for causing a computer to implement a method, the method further comprising:

during each of a plurality of iterations, generating a reconstructed image;

modifying said reconstructed image at each successive iteration by utilizing prior outer edge information obtained from a modality in addition to CT;

transforming said modified, reconstructed image to a projection domain so as to generate a calculated sinogram;

determining at least one of a correction image and a corrected image based on said calculated sinogram and a measured sinogram; and displaying the corrected image;

wherein the iterative reconstruction utilizes forward projection constraints in determining said calculated sinogram.

14. A computed tomography (CT) reconstruction method, the method comprising:

implementing an iterative image reconstruction process for CT metrology of an object, wherein said iterative reconstruction process utilizes prior outer edge information at each successive iteration obtained from a modality in addition to CT; and displaying an image created by the iterative reconstruction process.

* * * * *